(12) United States Patent
Fukunaga et al.

(10) Patent No.: US 11,833,792 B2
(45) Date of Patent: Dec. 5, 2023

(54) LAMINATE FOR MOLDING

(71) Applicant: MITSUBISHI GAS CHEMICAL COMPANY, INC., Tokyo (JP)

(72) Inventors: Yasutaka Fukunaga, Tokyo (JP); Fumiaki Kakeya, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 226 days.

(21) Appl. No.: 17/264,021

(22) PCT Filed: Aug. 5, 2019

(86) PCT No.: PCT/JP2019/030746
§ 371 (c)(1),
(2) Date: Jan. 28, 2021

(87) PCT Pub. No.: WO2020/031968
PCT Pub. Date: Feb. 13, 2020

(65) Prior Publication Data
US 2021/0316542 A1 Oct. 14, 2021

(30) Foreign Application Priority Data

Aug. 8, 2018 (JP) ................................ 2018-149542

(51) Int. Cl.
*B32B 33/00* (2006.01)
*C09D 7/61* (2018.01)
(Continued)

(52) U.S. Cl.
CPC ................ *B32B 33/00* (2013.01); *B32B 7/12* (2013.01); *B32B 27/08* (2013.01); *B32B 27/28* (2013.01);
(Continued)

(58) Field of Classification Search
None
See application file for complete search history.

(56) References Cited

U.S. PATENT DOCUMENTS

2012/0147300 A1* 6/2012 Fukuda ................ G02B 5/3083
349/194
2012/0321882 A1* 12/2012 Asai ........................ C08J 7/046
428/339

(Continued)

FOREIGN PATENT DOCUMENTS

| EP | 2 540 495 A1 | 1/2013 |
| JP | 9-127332 A | 5/1997 |

(Continued)

OTHER PUBLICATIONS

Owens—Est. surface free energy of polymers—J.Appl. Poly.Sci.—1969 (Year: 1969).*

(Continued)

*Primary Examiner* — John Vincent Lawler
(74) *Attorney, Agent, or Firm* — GREENBLUM & BERNSTEIN, P.L.C.

(57) ABSTRACT

The problem addressed by this invention is to provide a laminate for molding having excellent moldability and post-curing properties of the hard-coat layer, and which can maintain the surface of the hard-coat layer in a satisfactory state while uncured. This problem is solved by a laminate for molding containing a hard-coat layer and a masking film affixed to the surface of the hard-coat layer, having an adhesive surface, which is the hard-coat layer-side surface of the masking film, with a surface free energy of at least 30.0 (mN/m) measured in accordance with the OWRK method, before being affixed. The hard-coat layer is in an uncured state.

13 Claims, 3 Drawing Sheets

(51) Int. Cl.

| | | |
|---|---|---|
| C09D 7/40 | (2018.01) | |
| B32B 7/12 | (2006.01) | |
| B32B 27/08 | (2006.01) | |
| B32B 27/28 | (2006.01) | |
| B32B 27/32 | (2006.01) | |
| C09D 133/08 | (2006.01) | |
| C09D 7/47 | (2018.01) | |
| C09D 7/06 | (2006.01) | |

(52) U.S. Cl.
CPC .............. *B32B 27/32* (2013.01); *C09D 7/06* (2013.01); *C09D 7/61* (2018.01); *C09D 7/68* (2018.01); *C09D 133/08* (2013.01); *B32B 2255/10* (2013.01); *B32B 2255/26* (2013.01); *B32B 2307/538* (2013.01); *C09D 7/47* (2018.01)

(56) References Cited

U.S. PATENT DOCUMENTS

| | | | |
|---|---|---|---|
| 2015/0166815 A1* | 6/2015 | Horio | C09D 133/08 428/522 |
| 2016/0326383 A1* | 11/2016 | Pokorny | C09D 7/62 |

FOREIGN PATENT DOCUMENTS

| | | | | |
|---|---|---|---|---|
| JP | 2003/320622 A | * | 11/2003 | ............ B32B 27/06 |
| JP | 2004/299384 A | * | 10/2004 | ............ B29C 45/14 |
| JP | 2004-299384 A | | 10/2004 | |
| JP | 2006/043919 | * | 2/2006 | ............ B32B 33/00 |
| JP | 2009114376 A | * | 5/2009 | ............ C09J 201/00 |
| JP | 2010-052334 A | | 3/2010 | |
| JP | 2011-131410 A | | 7/2011 | |
| JP | 2012-20538 A | | 2/2012 | |
| JP | 2012/210755 | * | 11/2012 | ............... B05D 7/24 |
| JP | 2012-210755 A | | 11/2012 | |
| JP | 2014-128937 A | | 7/2014 | |
| JP | 2014128937 A | * | 7/2014 | ............... B29C 51/10 |
| JP | 2014-237302 A | | 12/2014 | |
| JP | 2015/104883 | * | 6/2015 | ........... B32B 27/302 |
| JP | 2015-104883 A | | 6/2015 | |
| JP | 2017-508828 A | | 3/2017 | |
| WO | WO-2015064022 A1 * | | 5/2015 | ........... B32B 27/302 |
| WO | WO-2015098685 A1 * | | 7/2015 | ............... G02B 1/10 |
| WO | WO-2015151795 A1 * | | 10/2015 | ............ C08F 232/08 |
| WO | 2018//038101 A1 | | 3/2018 | |
| WO | WO-2018038101 A1 * | | 3/2018 | ............... B05D 7/24 |

OTHER PUBLICATIONS

Hamaoka—JP 2004-299384 A—IDS—MT—surf.protect.layer+surf. protect.sheet of PE layer+adhesive—2004 (Year: 2004).*
Hongo—JP 2006-043919 A—MT—hard coat film—w- release film surface roughness Ra 0.1 um—2006 (Year: 2006).*
Sanchis—surf.mod. LDPE film by O2 plasma—Euro.Poly.J.—2006 (Year: 2006).*
Ishioka—JP 2012-210755 A—Euro D3—MT—hard coat film for molding—2012 (Year: 2012).*
Hashigaya—JP 2014-128937 A—IDS—MT—hard layer and PE peelable layer+motivation—2014 (Year: 2014).*
Watanabe—WO 2015-064022 A1—MT—acrylic release layer+ cured hard-coat+adhesive layer+base film—2015 (Year: 2015).*
Yasuda—JP 2015-104883 A—ISR D1+Euro D1—MT—thermally molded body w- 3 layers—2 cured layers—2015 (Year: 2015).*
Yajima—WO2018-038101 A1—ISR D2+Euro D2—MT—uncured resin layer + sur.treat. silica—2018 (Year: 2018).*
Horii—WO 2015-098685 A1—MT—optical film w- claimed surf. energy—2015 (Year: 2015).*
Andachi—WO 2015-151795 A1—MT—optical film w- hard coat w- surf.engy. 30 nM-m or more—2015 (Year: 2015).*
Keyence—Sa (Arithmetical Mean Height)_Area Roughness Parameters _ Introduction to Roughness—Feb. 16, 2023 (Year: 2023).*
Finishing.com—RMS vs Ra—Feb. 18, 2023 (Year: 2023).*
Harrison Electropolishing—Ra & RMS Surface Roughness Calculation—Feb. 18, 2023 (Year: 2023).*
Bongiovanni—adhesion of maleinized polyethylene films—J.Mat. Sci.—1998 (Year: 1998).*
Novak—surface and adhesive properties of polypropylene grafted by maleic—Poly.Sci.Eng.—2007 (Year: 2007).*
Sawada—JP 2009-114376 A—MT—release agent—surface protective film—2009 (Year: 2009).*
Suzuki—JP 3790220 A—MT—protection sheet PU w- roughness— 2006 (Year: 2006).*
International Search Report issued in International Patent Application No. PCT/JP2019/030746, dated Oct. 15, 2019, along with an English translation thereof.
Written Opinion of the International Searching Authority issued in International Patent Application No. PCT/JP2019/030746, dated Oct. 15, 2019, along with an English translation thereof.
Kazuyuki Sugita, "Surface Characteristics of Polymeric Materials and Their Modification", Journal of Printing Science and Technology, vol. 35, No. 4 (1998) pp. 202-210.
Journal of the Japan Society of Color Material, 73(10), (2000) pp. 485-488 (contains intermittent English language text).
Machine Translation (Google Translate) of introductory/summary paragraph of Journal of Japan Society of Color Material 2000.

* cited by examiner

[Figure 1]
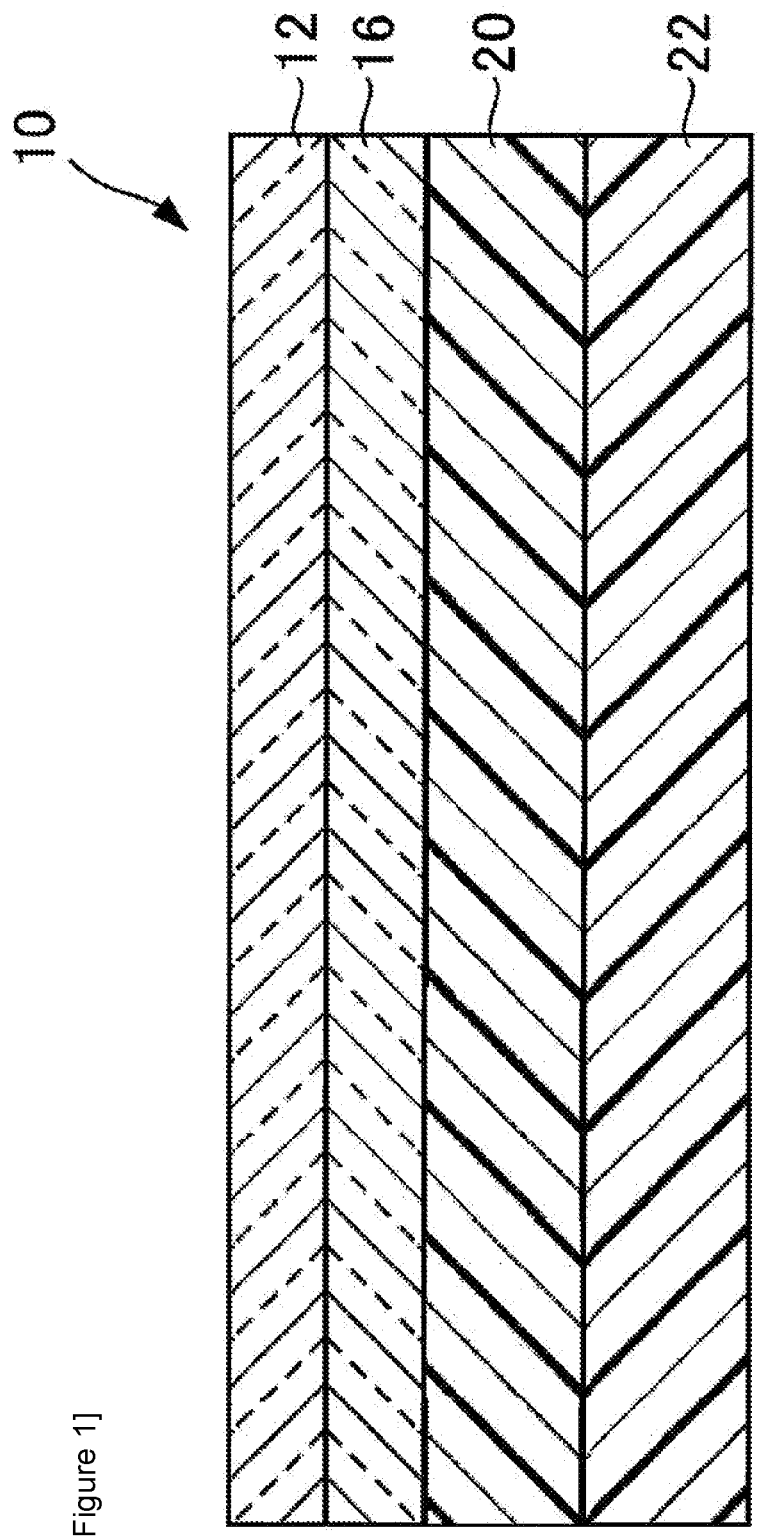

[Figure 2]
[Example 1]
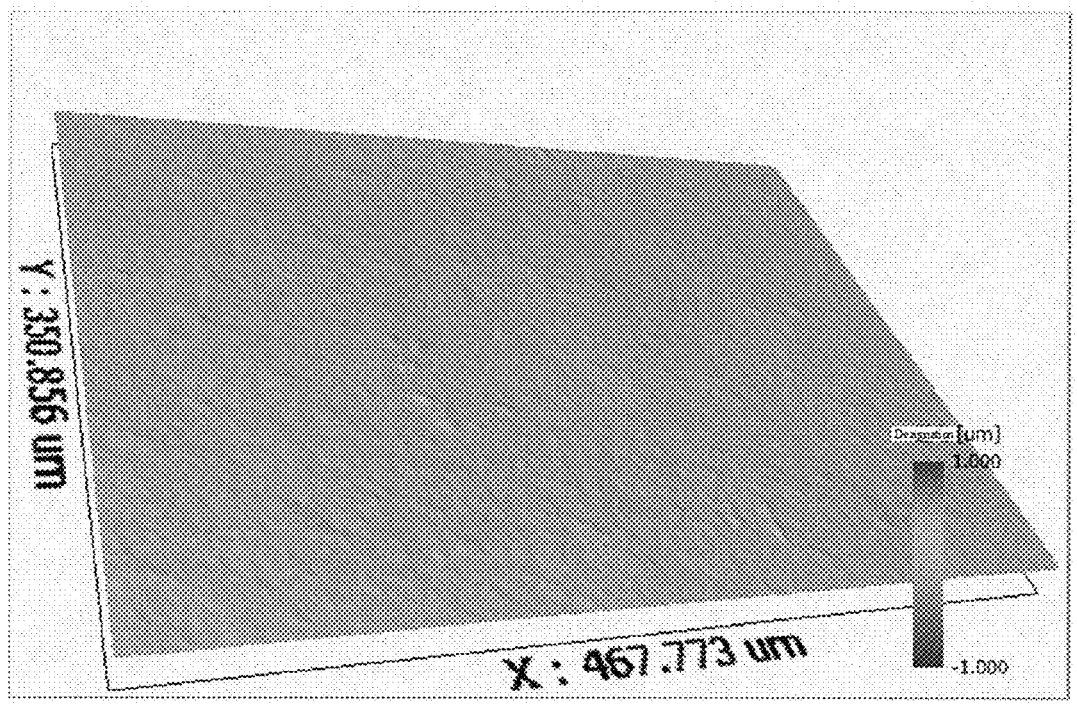
[Comparative Example 2]
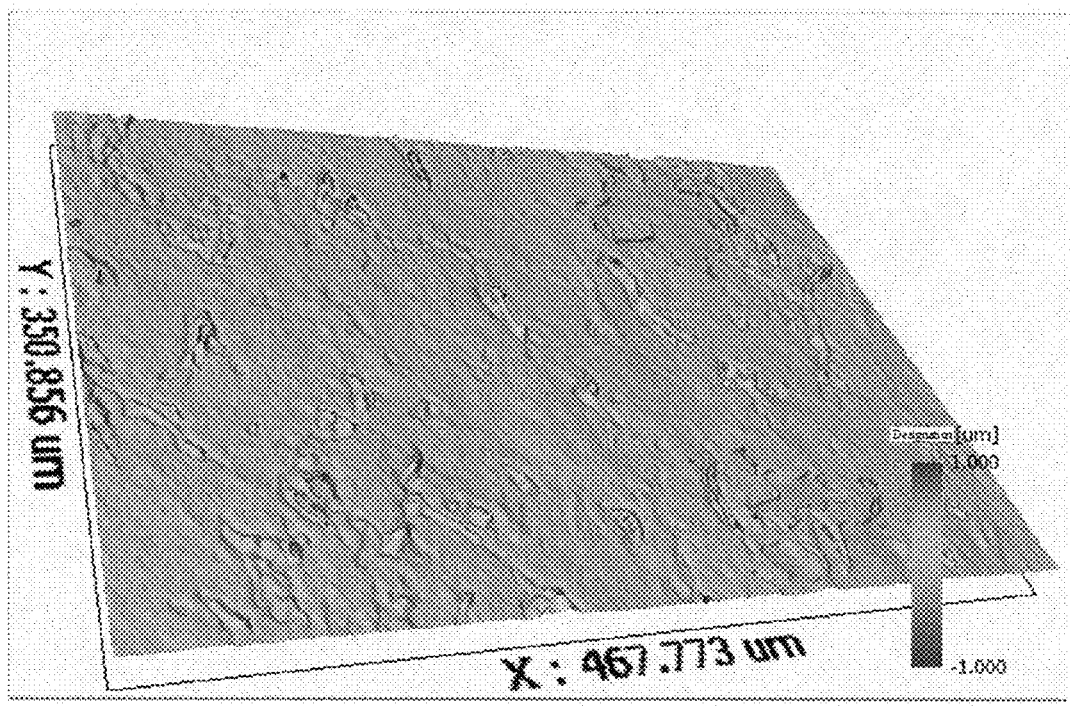

[Figure 3]
[Example 1]
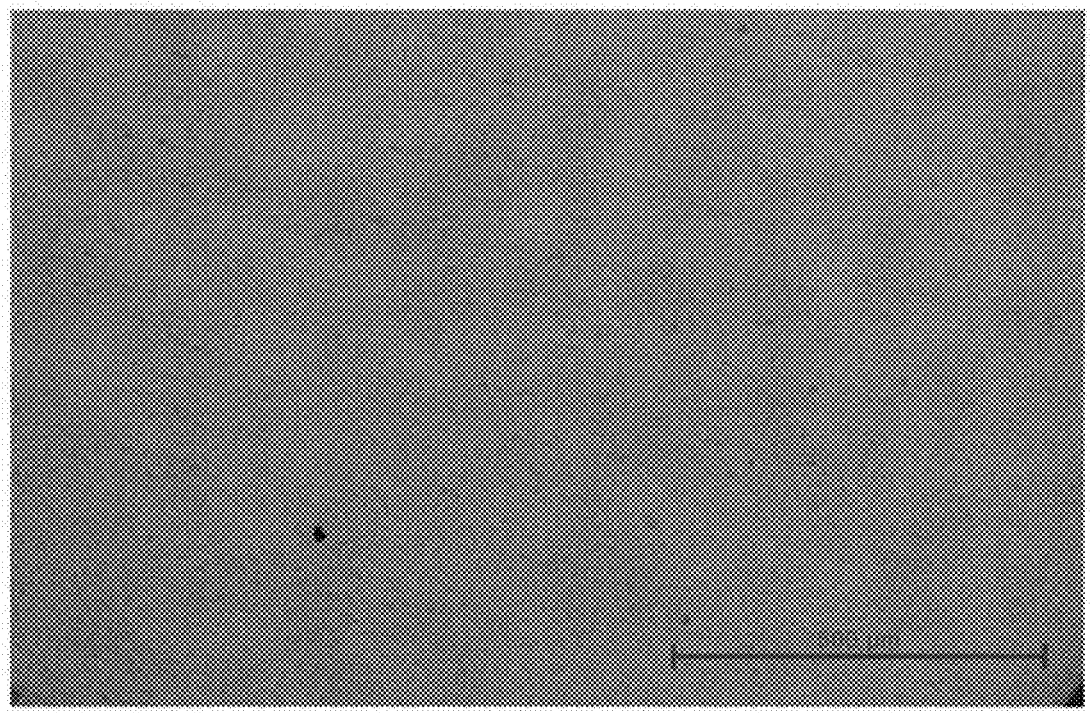
[Comparative Example 1]
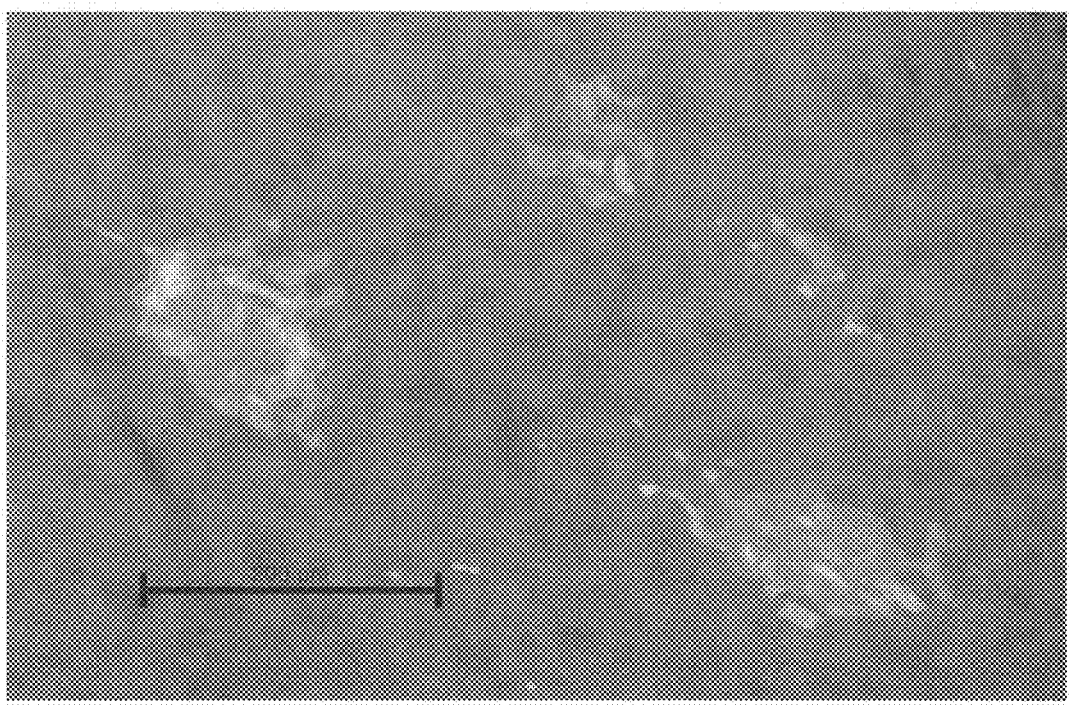

LAMINATE FOR MOLDING

TECHNICAL FIELD

The present invention relates to a laminate for molding, in particular, a laminate for molding obtained by layering a curable hard-coat layer and a masking film.

BACKGROUND ART

Resin film laminates having a hard-coat layer are conventionally used in various fields (see Patent document 1). For example, such resin film laminates are used in front and rear panels of mobile devices, automobile interior parts and the like.

PRIOR ART DOCUMENT

Patent Document

Patent document 1: Japanese Unexamined Patent Application Publication (translation of PCT) No. 2017-508828

SUMMARY OF THE INVENTION

Problems to be Solved by the Invention

A hard-coat layer used for protecting a surface of a resin film laminate is required to have certain levels of hardness and scratch resistance while satisfying moldability is required to produce a resin film laminate having a desired shape. In addition, since the surface of the hard-coat layer is soft in an uncured state, it is also necessary to keep the surface smooth and good. Accordingly, it has been difficult to satisfy all of these distinct characteristics in a hard-coat layer.

Thus, the objective of the present invention is to provide a laminate for molding that has excellent moldability as well as excellent properties after curing a hard-coat layer, and that can maintain the surface of the hard-coat layer to be favorable in an uncured state.

Means for Solving the Problems

The present inventors found that a laminate for molding comprising a curable hard-coat layer and a prescribed masking film affixed to the surface of the hard-coat layer has excellent characteristics that can solve the above-described problem, thereby accomplishing the present invention.

Thus, the present invention is as follows.
(1) A laminate for molding comprising a hard-coat layer and a masking film affixed to a surface of the hard-coat layer, wherein:
an adhesive surface of the masking film on the hard-coat layer side has surface free energy of 30.0 (mN/m) or more prior to being affixed, as calculated from the average contact angle of water and the average contact angle of diiodomethane according to the OWRK method; and
the hard-coat layer is curable.
(2) The laminate for molding according to (1) above, wherein the masking film comprises polyethylene.
(3) The laminate for molding according to either one of (1) and (2) above, wherein the surface roughness Sa of the adhesive surface of the masking film is 0.1 μm or less.
(4) The laminate for molding according to any one of (1) to (3) above, wherein the hard-coat layer comprises inorganic oxide nanoparticles.
(5) The laminate for molding according to (4) above, wherein the inorganic oxide nanoparticles comprise silica having a copolymerizable group on its surface.
(6) The laminate for molding according to (5) above, wherein the average particle size of the silica is 5-500 nm.
(7) The laminate for molding according to any one of (1) to (6) above, wherein the hard-coat layer comprises a (meth)acryloyl polymer.
(8) The laminate for molding according to any one of (1) to (7) above, wherein the hard-coat layer comprises a leveling agent.
(9) The laminate for molding according to (8) above, wherein the leveling agent further comprises a fluorine-based additive or a silicone-based additive.
(10) The laminate for molding according to any one of (1) to (9) above, wherein the hard-coat layer is energy beam-curable.
(11) The laminate for molding according to any one of (1) to (10) above, wherein the hard-coat layer further comprises a photopolymerization initiator.
(12) The laminate for molding according to any one of (1) to (11) above, further comprising a base layer which is layered on the surface of the hard-coat layer on the opposite side from the surface of the hard-coat layer that is affixed to the adhesive surface of the masking film.
(13) A curable hard-coat layer comprising a (meth)acryloyl polymer and inorganic oxide nanoparticles, wherein a surface of the hard-coat layer is designed to be affixed to a masking film to form a laminate for molding.

Advantageous Effect of the Invention

As described above, a laminate for molding of the present invention comprises a prescribed hard-coat layer and a masking film affixed to a surface of the hard-coat layer. The laminate for molding has excellent moldability as well as excellent properties after curing the hard-coat layer, and can maintain the surface of the hard-coat layer to be favorable in an uncured state.

Since a hard-coat composition of the present invention has such excellent characteristics, it is particularly suitable, for example, as a material of a resin film laminate used for mobile devices, automobile interior parts and the like.

BRIEF DESCRIPTION OF THE DRAWINGS

FIG. 1 A cross-sectional view showing a specific example of a laminate for molding including a masking film and a hard-coat layer.

FIG. 2 Diagrams each showing, based on processed data, the shape of the surface of the masking film of Example 1 or Comparative example 2 that was obtained one day after affixing the masking film to the hard-coat layer.

FIG. 3 Image data each showing the interface of the laminate of Example 1 or Comparative example 1, between the hard-coat layer and the adhesive layer (surface on the hard-coat layer side) of the masking film that was affixed to a surface of the hard coat.

EMBODIMENTS FOR CARRYING OUT THE INVENTION

Hereinafter, the present invention will be described in detail. The present invention is not limited to the following embodiments, and may be modified and carried out in any way as long as the invention can exert its effect.

[Laminate for Molding]

A laminate for molding of the present invention comprises a curable hard-coat layer and a masking film affixed to a surface of the hard-coat layer. As will be described later in detail, the adhesive surface of the masking film affixed to the hard-coat layer has high surface free energy and excellent wettability. A laminate for molding which has such a masking film layered on a hard-coat layer does not cause micro unevenness on the surface of the hard-coat layer that is affixed to the masking film, and can maintain the surface smooth even when the masking film is later peeled off and removed.

[Masking Film]

The surface of the masking film that makes contact with the hard-coat layer has suitable adhesiveness and can be affixed to a surface of the hard-coat layer. While the masking film may be a monolayer composed only of an adhesive layer, it preferably has a double-layer structure composed of a base material and an adhesive layer. In a masking film having a double-layer structure, the adhesive layer is layered on the hard-coat layer such that the adhesive surface of the adhesive layer makes contact with the hard-coat layer. The masking film may alternatively have a multi-layer structure that further includes a layer in addition to the above-described base material and adhesive layer. Moreover, the masking film may have a single-layer structure, in which case the adhesive surface of the single-layer masking film has suitable adhesiveness on the hard-coat layer side.

The base material of the masking film is preferably obtained by molding a thermoplastic resin, and more preferably the base material contains a polyolefin resin. Examples of the polyolefin resin contained in the masking film include polyethylene and polypropylene, which may be either a homopolymer or a copolymer. Among polyolefin resins, polyethylene is preferable.

While a low-density polyethylene (LDPE), a linear low-density polyethylene (LLDPE), a very-low-density polyethylene (VLDPE), a medium-density polyethylene (MDPE), a high-density polyethylene (HDPE) or the like may be used as the polyethylene, a low-density polyethylene is preferable.

Moreover, the polyolefin copolymer may be a copolymer of ethylene or propylene and a monomer that can copolymerizable therewith. Examples of the monomer copolymerizable with ethylene or propylene include α-olefin, a styrene, a diene, a cyclic compound, and an oxygen atom-containing compound.

Examples of the above-mentioned α-olefin include 1-butene, 3-methyl-1-butene, 3-methyl-1-pentene, 4-methyl-1-pentene, 1-pentene, 1-hexene, 1-heptene, 1-octene, 1-decene, 1-tetradecene, 1-hexadecene, 1-octadecene and 1-eicosene. Examples of the above-mentioned styrene include styrene, 4-methylstyrene and 4-dimethylamino styrene.

Examples of the above-mentioned diene include 1,3-butadiene, 1,5-hexadiene, 1,4-hexadiene and 1,7-octadiene. Examples of the above-mentioned cyclic compound include norbornene and cyclopentene. Examples of the oxygen atom-containing compound include hexenol, hexenoic acid and methyl octanoate. One or more of these copolymerizable monomers may be used alone or in combination. Alternatively, it may also be a copolymer of ethylene and propylene.

The copolymer may be any of an alternating copolymer, a random copolymer and a block copolymer.

The polyolefin resin contained in the base material of the masking film may contain a modified polyolefin resin which has been modified by a small amount of a carboxyl group-containing monomer such as acrylic acid, maleic acid, methacrylic acid, maleic anhydride, fumaric acid, itaconic acid or the like. Modification can usually be carried out by copolymerization or graft modification.

The base material of the masking film preferably contains the polyolefin resin preferably in an amount of 80 wt % or more, more preferably in an amount of 90 wt % or more and still more preferably in an amount of 95 wt % or more with respect to the total weight of the base material.

The adhesive layer of the masking film is preferably obtained by molding an elastomer or a thermoplastic resin. Examples of the thermoplastic resin contained in the adhesive layer include polyolefin resins such as polypropylene and a modified polyolefin. Examples of the polyolefin resin contained in the masking film include polyethylene and polypropylene, which may be either a homopolymer or a copolymer. Among other polyolefin resins, polyethylene is preferable.

The adhesive layer of the masking film contains an elastomer or a thermoplastic resin in an amount of preferably 80 wt % or more, more preferably 90 wt % or more, and still more preferably 95 wt % or more or with respect to the total weight of the adhesive layer.

The adhesive surface of the masking film, that is, the adhesive surface that makes contact with a surface of the hard-coat layer, has surface free energy of 30.0 (mN/m) or more before it is affixed to the hard-coat layer. The surface free energy is determined by measuring the average contact angle of 1 µl of water and the average contact angle of 1 µl of diiodomethane ($CH_2I_2$) placed on the above-described adhesive surface according to the θ/2 method, and then calculating the surface free energy from these average contact angles according to the OWRK method (Owens-Wendt-Rabel-Kaelble method). The surface free energy of the above-described adhesive surface is preferably 31.0 (mN/m) or more.

The average contact angle of 1 µl of diiodomethane placed on the adhesive surface of the masking film that makes contact with the surface of the hard-coat layer is preferably 64° or less, more preferably 60° or less and still more preferably 58° or less.

A masking film having an adhesive surface with high surface free energy, i.e., a low contact angle upon placing a drop of diiodomethane on said surface, is assumed to have high wettability. When a surface of a hard-coat layer described later in detail is coated with a masking film having high wettability, the surface of the hard-coat layer can easily maintain its smoothness without causing micro unevenness.

In addition, since such a masking film can even ensure protection of a surface of a soft hard-coat layer that is in an uncured state, the moldability of the hard-coat layer can easily be enhanced.

The surface roughness Sa of the adhesive surface of the masking film that will make contact with the hard-coat layer (ISO 25178) is preferably 0.100 µm or less before the masking film is affixed to the hard-coat layer (in an unaffixed state). The surface roughness Sa of the adhesive surface of the masking film in an unaffixed state is more preferably 0.090 µm or less, still more preferably 0.080 µm or less and particularly preferably 0.070 µm or less.

Adhesiveness of the adhesive surface of the masking film to a surface of PMMA (polymethyl methacrylate resin layer) is preferably 5 (mN/25 mm) to 5000 (mN/25 mm) and more preferably 9 (mN/25 mm) to 3000 (mN/25 mm).

The thickness of the masking film in the laminate for molding is preferably 10 μm-100 μm and more preferably 20 μm-80 μm.

[Hard-Coat Layer]

A hard-coat layer included in the laminate for molding is obtained by molding a hard-coat composition into a layer shape, which is curable by irradiation with an energy beam or the like. The hard-coat layer (hard-coat composition) preferably comprises a (meth)acryloyl polymer and inorganic oxide nanoparticles. The hard-coat composition has excellent moldability and tack-free property prior to curing such that once the masking film is peeled off and removed from the laminate for molding and the resultant is cured, it can realize high hardness and excellent scratch resistance in the hard-coat layer forming the outermost layer of the cured laminate.

Preferably, the hard-coat composition contains a (meth)acryloyl polymer in an amount of 20-80 wt % and inorganic oxide nanoparticles in an amount of 80-20 wt % with respect to the total amount of the hard-coat composition. More preferably, the hard-coat composition contains a (meth)acryloyl polymer in an amount of 30-70 wt % and inorganic oxide nanoparticles in an amount of 70-30 wt %. Still more preferably, the hard-coat composition contains a (meth)acryloyl polymer in an amount of 40-60 wt % and inorganic oxide nanoparticles in an amount of 60-40 wt %.

The thickness of the hard-coat layer is preferably 1.0 μm-10 μm. The thickness of the hard-coat layer is, for example, 2.0 μm-8.0 μm or 3.0 μm-7.0 μm.

In addition, when the masking film is affixed to a hard-coat layer formed from a (meth)acryloyl polymer which will be described later, and a pressure of 30 kg/m² is applied to the masking film under the conditions of a temperature of 23±2° C. and a relative humidity of 50±5% for 24 hours, the Sa value of the surface of the hard-coat layer after peeling off the masking film is preferably 0.0300 μm or less, more preferably 0.0200 μm or less and still more preferably 0.0150 μm or less.

Here, the conditions for peeling off the masking film from the surface of the hard-coat layer are such that the peel-off angle, that is, the angle between the masking film and the surface of the hard-coat layer during peeling, is 90 degrees and the peel-off rate is 600 mm/min.

<(Meth)Acryloyl Polymer>

The (meth)acryloyl polymer has a (meth)acrylate equivalent of 200-500 g/eq. The (meth)acrylate equivalent of the (meth)acryloyl polymer is preferably 220-450 g/eq and more preferably 250-400 g/eq.

Furthermore, the (meth)acryloyl polymer has a weight average molecular weight of 5,000-200,000. The weight average molecular weight of the (meth)acryloyl polymer is preferably 10,000-150,000, more preferably 15,000-100,000 and still more preferably 20,000-50,000.

The weight average molecular weight can be measured based on the description in paragraphs 0061-0064 of Japanese Unexamined Patent Application Publication No. 2007-179018. Hereinafter, the measurement method will be described in detail.

TABLE 1

| Conditions for measuring weight average molecular weight | |
|---|---|
| Device | "Aliance" available from Waters |
| Columns | "Shodex K-805L" available from Showa Denko K.K. (2 columns) |

TABLE 1-continued

| Conditions for measuring weight average molecular weight | |
|---|---|
| Detector | UV detector: 254 nm |
| Eluent | Chloroform |

Specifically, a calibration curve representing the relationship between the elution time and the molecular weight of polycarbonate was first prepared by universal calibration using polystyrene as standard polymers. Then, an elution curve (chromatogram) of the polycarbonate was determined under the same conditions as the above-described calibration curve. Furthermore, a weight average molecular weight (Mw) was calculated from the elution time (molecular weight) of the polycarbonate and the peak area of the corresponding elution time (number of molecules). The weight average molecular weight can be expressed by Equation (A) below, where Ni represents the number of molecules having molecular weight Mi.

$$Mw = \Sigma(NiMi^2)/\Sigma(NiMi) \quad (A)$$

Herein, (meth)acrylate refers to both acrylate and methacrylate.

As described above, a hard-coat composition containing a (meth)acryloyl polymer having a (meth)acrylate equivalent and a weight average molecular weight in prescribed ranges has good tack-free property prior to curing and good scratch resistance after curing, and is also capable of facilitating curing/polymerization reactions.

The (meth)acryloyl polymer contained in the hard-coat composition preferably has a repeat unit represented by Formula (I) below.

[Chemical formula 1]

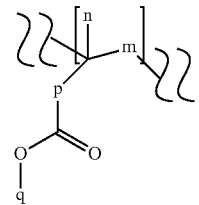

(I)

In Formula (I), m is a C1-4 alkylene group or a single bond, n is a C1-4 alkyl group or hydrogen, p is a single bond or a C1 or C2 alkylene group, and q is hydrogen or an alkyl group having a total carbon number of 1-12 that may contain at least one substituent selected from an epoxy group, a hydroxy group, an acryloyl group and a methacryloyl group.

More preferably, the (meth)acryloyl polymer contains the following repeat unit, namely, a repeat unit represented by Formula (I) above where m is a C1 or C2 alkylene group, n is a C1 or C2 alkyl group, p is a single bond or a methylene group, and q is hydrogen or an alkyl group having a total carbon number of 1-6 that may contain at least one substituent selected from a glycidyl group, a hydroxy group and an acryloyl group.

For example, in Formula (I) above, m is a methylene group, n is a methyl group, p is a single bond, and q is an alkyl group with a carbon number of 5 or less containing a methyl group or a glycidyl group (an epoxy group) or an alkyl group with a carbon number of 8 or less containing a hydroxy group or an acryloyl group.

Specific example of the repeat unit contained in the (meth)acryloyl polymer include those represented by Formulae (II-a), (II-b) and (II-c) below.

[Chemical formula 2]

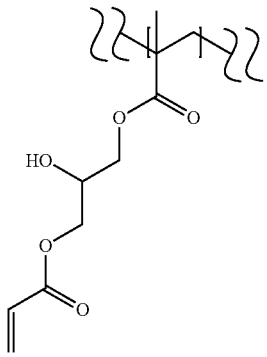

(II-a)

(II-b)

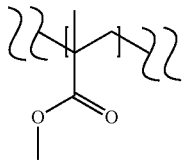

(II-c)

In the (meth)acryloyl polymer, the repeat unit represented by Formula (II-a) above is in an amount of preferably 30-85 mol % and more preferably 40-80 mol % with respect to the total number of moles of the repeat units represented by Formulae (II-a), (II-b) and (II-c) above. The repeat unit represented by Formula (II-b) above is in an amount of preferably 5-30 mol % and more preferably 10-25 mol % with respect to said total number of moles. In addition, the repeat unit represented by Formula (II-c) above is in an amount of preferably 10-40 mol % and more preferably 10-35 mol % with respect to said total number of moles.

Furthermore, the mole ratio of the repeat units represented by Formulae (II-a), (II-b) and (II-c) above is preferably 4.5-5.5:1.5-2.5:2.5-3.5, for example, 5:2:3.

The (meth)acryloyl polymer may be added with a pentaerythritol-based polyfunctional acrylate compound. As a polyfunctional acrylate compound having multiple acrylate groups, preferably three or more acrylate groups, for example, pentaerythritol tetraacrylate and dipentaerythritol hexaacrylate represented by Formulae (III-a) and (III-b) below, respectively, as well as pentaerythritol triacrylate or the like may be used.

[Chemical formula 3]

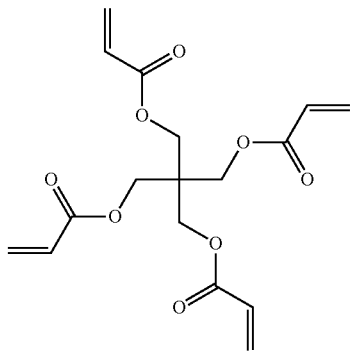

(III-a)

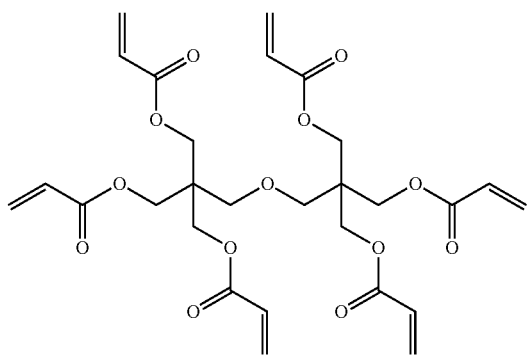

(III-b)

The polyfunctional acrylate compound is contained in an amount of preferably 70 wt % or less and more preferably 50 wt % or less with respect to the total weight with the (meth)acryloyl polymer. Thus, the polyfunctional acrylate compound can be added to the hard-coat composition so that it can react with the acryloyl group, the glycidyl group (epoxy group) and the hydroxy group contained in the side chain of the (meth)acryloyl polymer, thereby forming a hard-coat membrane having improved scratch resistance.

<Inorganic Oxide Nanoparticles>

The inorganic oxide nanoparticles contained in the hard-coat composition may be silica particles, alumina particles or the like, among which the inorganic oxide nanoparticles preferably comprises silica particles. The inorganic oxide nanoparticles contained in the hard coat are preferably treated with a surface treatment agent. By this surface treatment, the inorganic oxide nanoparticles can be dispersed stably in the hard-coat composition, particularly in the (meth)acryloyl polymer component.

The surface treatment agent used for the inorganic oxide nanoparticles is preferably a compound having a substituent that can bind to the surface of the inorganic oxide nanoparticles and a substituent highly compatible with the component of the hard-coat composition, particularly, the (meth) acryloyl polymer, in which the inorganic oxide nanoparticles are to be dispersed. Examples of the surface treatment agent include a silane compound, alcohol, an amine, carboxylic acid, sulfonic acid, phosphonic acid and the like.

The inorganic oxide nanoparticles preferably have a copolymerizable group on their surface. The copolymerizable group can be incorporated by a surface treatment of the inorganic oxide nanoparticles. Specific examples of the copolymerizable group include a vinyl group, a (meth) acrylate group and a free radical polymerizable group.

The average particle size of the inorganic oxide nanoparticles is preferably 5-500 nm, more preferably 10-300 nm and still more preferably 20-100 nm. The average particle size of the inorganic oxide nanoparticles can be measured, for example, by a measurement method employing dynamic light scattering using Zetasizer Nano ZS available from Malvern Panalytical Ltd.

<Other Components in Hard-Coat Composition>

In addition to the above-described (meth)acryloyl polymer and inorganic oxide nanoparticles, the hard-coat composition preferably further comprises a leveling agent. Examples of the leveling agent include a fluorine-based additive, a silicone-based additive and the like.

MEGAFACE RS-56, RS-75, RS-76-E, RS-76-NS, RS-78 and RS-90 available from DIC, Ftergent 710FL, 220P, 208G, 601AD, 602A, 650A and 228P, and Ftergent 240GFTX-218 available from NEOS (all of them are oligomers containing a fluorine group and UV-reactive group) and the like can be used as the fluorine-based additive, among which Ftergent 601AD and the like are favorable as the fluorine-based additive.

Moreover, BYK-UV3500 and BYK-UV3505 available from BYK-Chemie GmbH (all of them are polyether-modified acrylate functional polydimethylsiloxanes) and the like can be used as the silicone-based additive, among which BYK-UV3500 and the like are preferable as the silicone-based additive.

A leveling agent is preferably contained in the hard-coat composition in an amount of 0.1 wt % to 10 wt % with respect to the total amount of the hard-coat composition. The content of the leveling agent in the hard-coat composition is more preferably 0.5 wt % to 7 wt % and still more preferably 1 wt % to 5 wt %.

Furthermore, while the curable hard-coat composition may be either energy beam-curable or thermally curable, it is preferably energy beam-curable and more preferably UV curable. Accordingly, the hard-coat composition preferably further contains a photopolymerization initiator. Examples of the photopolymerization initiator include IRGACURE 184 (1-hydroxy-cyclohexyl-phenyl-ketone), IRGACURE 1173 (2-hydroxy-2-methyl-1-phenyl-propane-1-one), IRGACURE TPO (2,4,6-trimethylbenzoyl-diphenyl-phosphine oxide), IRGACURE 819 (bis(2,4,6-trimethylbenzoyl)-phenylphosphine oxide) and Esacure ONE (oligo(2-hydroxy-2-methyl-1-[4-(1-methylvinyl)phenyl]propanone), among which IRGACURE TPO or the like is favorable as the photopolymerization initiator in terms of heat resistance.

A photopolymerization initiator is contained in the hard-coat composition in an amount of 1 wt % to 6 wt % with respect to the total amount of the hard-coat composition.

The content of the photopolymerization initiator in the hard-coat composition is more preferably 2 wt % to 5 wt % and still more preferably 3 wt % to 4 wt %.

The hard-coat composition may contain other additives, for example, at least one additive selected from the group consisting of a heat stabilizer, an antioxidant, a flame retardant, a flame-retardant auxiliary, a UV absorber, a mold release agent and a colorant. An antistatic agent, a fluorescent brightening agent, an anti-fog agent, a fluidity modifier, a plasticizer, a dispersant, an antibacterial agent and the like can also be added to the hard-coat composition as long as the desired physical properties are not significantly impaired. The (meth)acryloyl polymer and the inorganic oxide nanoparticles are contained in the hard-coat composition in an amount of, preferably 60 mass % or more, still more preferably 80 mass % or more and particularly preferably 90 mass % or more. Accordingly, the content of the components other than the above-described two primary components in the hard-coat composition is preferably less than 40 mass %, more preferably less than 20 mass % and particularly preferably less than 10 mass %.

<Production of Hard-Coat Layer>

The hard-coat layer can be produced by blending the materials, namely, the above-described (meth)acryloyl polymer, inorganic oxide nanoparticles and the like. For example, the components including the (meth)acryloyl polymer and the like are mixed in a tumbler, and the mixture is further melt-kneaded in an extruder to produce a (meth) acryloyl polymer. The form of the hard-coat composition at this point is not limited to pellets, and may be flakes, powder, a bulk or the like.

Then, the hard-coat composition can be processed into a layer shape (sheet shape) by a conventional technique such as extrusion molding or casting to produce a hard-coat layer. An example of extrusion molding include a method in which pellets, flakes or powder of the hard-coat composition is molten and kneaded in an extruder, then the resultant is extruded through a T-die or the like, and the resulting half molten sheet is cooled and solidified while pressing with rolls, thereby forming a sheet.

<Properties of Hard-Coat Layer>

(i) Tack-Free Property

The hard-coat layer of the present invention has an excellent tack-free property. Therefore, in a laminate for molding which has this hard-coat layer coated with a masking film, even if a hard-coat layer in an uncured state touches to other material, for example, a hand of the operator, the hard-coat layer can maintain its predetermined shape and can be prevented from partially attaching to the surface of the material touching the composition. Hence, the laminate for molding having such excellent characteristics can facilitate processing in which the laminate is molded into a shape suitable for use and then cured. Furthermore, the laminate for molding in an uncured state can conveniently be stored or distributed while maintaining its predetermined shape.

On the other hand, a resin composition having a poor tack-free property, for example, a laminate comprising a hard-coat layer composed mainly of a low-molecular-weight oligomer or the like, requires a curing step prior to molding into a shape suitable for various applications, and thus it is found to be poor in moldability.

(ii) Gloss (Appearance) after Peeling Off Mask

When the hard-coat layer is processed into a film in an uncured state and a masking film is layered thereon and peeled off, the hard-coat composition can prevent unevenness to be caused on the film surface and can maintain high gloss. As will be described later in detail, in such an evaluation test, the hard-coat layer of the present invention was confirmed to retain smooth and high gloss surface after the masking film was peeled off.

(iii) Moldability (Pressure Forming Property)

The hard-coat layer of the laminate for molding of the present invention also has excellent moldability in an uncured state. The moldability of the hard-coat composition can be evaluated, for example, as follows. Specifically, a hard-coat composition is applied and dried on a surface of a base layer to give a laminate, which is placed and heated on a mold having a projection to see if the sheet-shaped hard-coat composition can appropriately stretch along the projection upon pressure forming, to see if a crack is generated, and the like.

Without going into detail, in such an evaluation test, the hard-coat layer was confirmed to be capable of stretching appropriately along the projections without generating a crack upon pressure forming.

(iv) Scratch Resistance

Excellent scratch resistance can be realized by curing the hard-coat layer after removing the masking film. As will be described later in detail, when a laminate for molding having the hard-coat layer is cured, the scratch resistance of the surface of the hard-coat layer was confirmed to be superior to cured PMMA resins (polymethyl methacrylate resins) and resins for lenses.

(v) Hardness

The hard-coat layer that is cured after removing the masking film has high hardness. Specifically, pencil hardness of B or harder can be realized as evaluated according to JIS K 5600-5-4: 1999. Pencil hardness of preferably F or harder and particularly preferably 2H or harder is realized on the surface of the cured hard-coat layer.

(vi) Adhesiveness

The cured hard-coat composition is also excellent in adhesiveness. Specifically, a hard-coat composition having a score of 0 as evaluated according to JIS K 5600-5-6: 1999 can be obtained.

<Base Layer>

Preferably, the laminate for molding of the present invention further comprises a base layer that makes contact with the surface of the hard-coat layer on the opposite side from the masking film. The base layer is layered on the surface of the hard-coat layer opposite from the surface that is affixed to the adhesive surface of the masking film.

The base layer of the laminate for molding preferably contains a resin, and more preferably contains a thermoplastic resin. While the kind of the thermoplastic resin is not particularly limited, various resins can be used, for example, a polycarbonate (PC) resin, an acrylate resin such as polymethyl methacrylate (PMMA), polyethylene terephthalate (PET), triacetyl cellulose (TAC), polyethylene naphthalate (PEN), polyimide (PI), cycloolefin copolymer (COC), a norbornene-containing resin, polyethersulfone, cellophane, an aromatic polyamide or the like. Among others, the thermoplastic resin of the base layer preferably contains at least a polycarbonate resin.

While the kind of the polycarbonate resin contained in the base layer is not particularly limited as long as it includes a —[O—R-OCO]— unit that contains a carbonate ester bond in the main chain of the molecule (where R is an aliphatic or aromatic group or includes both aliphatic and aromatic groups, and has a linear or branched structure), it is preferably a polycarbonate having a bisphenol backbone, and particularly preferably a polycarbonate having a bisphenol A backbone or a bisphenol C backbone. The polycarbonate resin may also be a mixture or a copolymer of bisphenol A and bisphenol C. A bisphenol C-based polycarbonate resin, for example, a polycarbonate resin composed only of bisphenol C, or a polycarbonate resin of a mixture or a copolymer of bisphenol C and bisphenol A, can be used to enhance the hardness of the base layer.

In addition, the viscosity average molecular weight of the polycarbonate resin is preferably 15,000-40,000, more preferably 20,000-35,000 and still more preferably 22,500-25,000.

While the acrylate resin contained in the base layer is not particularly limited, it is, for example, a homopolymer of a (meth)acrylate ester exemplified by polymethyl methacrylate (PMMA) and methyl methacrylate (MMA), a copolymer of PMMA or MMA with one or more other monomers, or a mixture of these multiple kinds of resins. Among others, a (meth)acrylate including a cyclic alkyl structure having low birefringence, low hygroscopic property and excellent heat resistance is favorable. Examples of such (meth)acrylate resin include, but not limited to, ACRYPET (available from Mitsubishi Rayon Co., Ltd.), DELPET (available from Asahi Kasei Chemicals Corporation) and PARAPET (available from Kuraray Co., Ltd.).

Preferably, a laminate obtained by layering the above-described acrylate resin on an outer surface of a polycarbonate resin is used as a base material so that the hardness of the outer surface of the base layer can be improved.

In addition, the base layer may further contain an additive as a component other than the thermoplastic resin. Such additive may be, for example, at least one additive selected from the group consisting of a heat stabilizer, an antioxidant, a flame retardant, a flame-retardant auxiliary, a UV absorber, a mold release agent and a colorant. Moreover, an antistatic agent, a fluorescent brightening agent, an anti-fog agent, a fluidity modifier, a plasticizer, a dispersant, an antibacterial agent or the like may be added to the base layer.

The base layer contains a thermoplastic resin in an amount of preferably 80 mass % or more, more preferably 90 mass % or more and particularly preferably 95 mass % or more. The thermoplastic resin of the base layer contains a polycarbonate resin in an amount of preferably 80 mass % or more, more preferably 90 mass % or more and particularly preferably 95 mass % or more.

While the thickness of the base layer is not particularly limited, it is preferably 0.1 mm to 1.0 mm. The thickness of the base layer is, for example, 0.2 mm-0.8 mm or 0.3 mm-0.7 mm.

The laminate film has a structure, for example, as one shown in FIG. 1. In a laminate for molding 10 exemplified in FIG. 1, an outermost masking film 12 is layered on a hard-coat layer 16. Accordingly, the surface of the hard-coat layer 16 on the masking film 12 side is protected by the masking film. The hard-coat layer 16 is layered on a surface of a base layer having a polymethyl methacrylate layer (PMMA resin layer) 20 and a polycarbonate layer (PC resin layer) 22, where the hard-coat layer is layered on the PMMA layer side.

<Production of Laminate for Molding>

A laminate for molding comprising a base layer is produced as follows. First, a base layer is produced by processing a material such as a resin composition into a layer shape (sheet shape) by a conventional technique such as extrusion molding or casting. An example of extrusion molding include a method in which pellets, flakes or powder of the resin composition is molten and kneaded in an extruder, then the resultant is extruded through a T-die or the like, and the resulting half molten sheet is cooled and solidified while pressing with rolls, thereby forming a sheet.

Then, the coating composition produced as described above is applied on an outer surface of the base layer consisting of a single layer or multiple layers, thereby forming a hard-coat layer.

The above-described masking film is affixed to the surface of the laminate of the base layer and the hard-coat layer obtained above on the hard-coat layer side or on the surface of a hard-coat monolayer, thereby producing a laminate for molding.

After the masking film is removed from this laminate for molding, the laminate for molding can be cured to obtain a cured film. Thus, the laminate for molding has a curable hard-coat layer which can be cured to obtain a cured film.

As can be appreciated from the above-described properties of the hard-coat composition after curing, the surface of the cured film on the hard-coat layer side has excellent properties. Specifically, the surface of the cured film on the hard-coat layer side can realize high pencil hardness (preferably, pencil hardness of B or harder as determined by JIS K 5600-5-4: 1999), high scratch resistance and excellent adhesiveness (for example, adhesiveness score of 0 as evaluated according to JIS K 5600-5-6).

EXAMPLES

Hereinafter, the present invention will be described more specifically by way of examples. The present invention, however, should not be limited to the following examples, and can be modified and carried out in any way without departing from the scope of the present invention.

[Production of Laminate]

First, nanosilica particles (Organo silica sol MEK-AC-2140Z available from Nissan Chemical Corporation: average particle size 10-15 nm) were mixed with a UV curable acryloyl polymer (ART CURE RA-3602MI available from Negami Chemical Industrial Co., Ltd.) such that the weight ratio of the acryloyl polymer and the nanosilica particles was adjusted to 60:40. In addition, a photopolymerization initiator IRGACURE TPO (3 wt % with respect to the solid content) and a leveling agent BYK-UV3500 available from BYK-Chemie GmbH (1 wt % with respect to the solid content) were added to give a mixture.

To the resulting mixture, MEK was further added as a dilution solvent to prepare a coating composition having a solid content adjusted to 30 wt %, which was used to coat a PC/PMMA film as a base layer on the PMMA side.

The coating step was carried out using a #16 wire-wound rod, and the applied coating solution was dried at 120° C. for 5 minutes. The dried coating solution formed a hard-coat layer with a thickness of about 7 μm.

Moreover, the followings were prepared as masking films having the base materials and the adhesive layers indicated in Table 2 below. Specifically, a laminate composed of a PE (polyethylene) base material and a modified PO (polyolefin) adhesive layer (Example 1: PAC-3-50THK available from Sun A. Kaken, thickness 50 μm);

a laminate composed of a PET (polyethylene terephthalate) base material and a PU (polyurethane) adhesive layer (Example 2: PU4050 available from Sun A. Kaken, thickness 50 μm);

a laminate composed of a PP (polypropylene) base material and a PP adhesive layer (Example 3: MX-107-N available from Nihon Matai Co., Ltd., thickness 30 μm);

a laminate composed of a PP base material and an elastomer adhesive layer (Comparative example 1: FSA-050M available from Futamura Chemical Co., Ltd., thickness 30 μm); and a laminate composed of a PP (polypropylene) base material and a PE adhesive layer (Comparative example 2: R033KS available from Toray Advanced Film Co., Ltd., thickness 45 μm).

An average contact angles of drops of 1 μl of water and 1 μl of diiodomethane ($CH_2I_2$) on the surface of the masking film, the hard-coat layer and the base layer were determined according to a fitting method (Height Width Automatic method (θ/2 method) using a MSA analyzer available from KRUSS GmbH. Furthermore, surface free energy was derived from these average contact angles according to the OWRK method (Owens-Wendt-Rabel-Kaelble method). These results are shown in Table 2 below.

Furthermore, the masking film of each of the examples and the comparative examples was affixed to the surface of the hard-coat layer on the opposite side from the base material, and a pressure of 30 kg/m² was applied to the masking film at a temperature of 23±2° C. and a relative humidity of 50±5%. After 24 hours and after a week, the surface of each of the hard-coat layers was observed. The surface was observed with a white light interferometer microscope (VS-1530 available from Hitachi High-Tech Science Corporation) and an optical microscope (ECLIPSE LV100ND available from Nikon Corporation). The surface roughness Sa (according to ISO 25178) was measured with a scanning white light interferometer microscope VS1530 available from Hitachi High-Tech Science Corporation. While no or little inclusion of air was observed between the masking film and the hard-coat layer upon layering in the examples, inclusion of air was clearly observed in the comparative examples. Accordingly, there seemed to be difference in the shape (appearance) of the surface of the hard-coat layer after peeling off the masking film.

Thus, as shown in Table 2 below and FIG. 2, the surface of the hard-coat layer of the example had substantially no unevenness, was smooth and had excellent gloss after peeling off the masking film, whereas the surface of the hard-coat layer of the comparative example had micro unevenness and poor gloss after peeling off the masking film. In addition, as shown in FIG. 3, when the masking film was affixed to the hard-coat surface of the example, the hard-coat layer and the masking film adhesive layer were closely attached and realized high adhesiveness at the interface, whereas gap was found between these layers in the comparative example.

TABLE 2

| | | Example 1 | Example 2 | Example 3 | Comparative example 1 | Comparative example 2 |
|---|---|---|---|---|---|---|
| Masking film | Material (Base material/Adhesive layer) | PE/Modified PO | PET/PU | PP/PP | PP/Elastomer | PP/PE |
| | Adhesiveness to PMMA (mN/25 mm) | 50 | 10 | 20 | 50 | 150 |
| | Average contact angle (°) Water | 99.1 | 73.9 | 85 | 87 | 97.1 |
| | $CH_2I_2$ | 54.4 | 27.2 | 58.2 | 71.3 | 69.9 |
| | Surface free energy (mN/m) | 31.9 | 46.9 | 31.3 | 25.3 | 23.4 |
| | Surface roughness Sa prior to being affixed (μm) | 0.0231 | 0.0244 | 0.0713 | 0.0572 | 0.1227 |

TABLE 2-continued

| | | | Example 1 | Example 2 | Example 3 | Comparative example 1 | Comparative example 2 |
|---|---|---|---|---|---|---|---|
| Hard-coat layer | Material | | Acrylic polymer/Nanosilica particles | | | Acrylic polymer/Nanosilica particles | |
| | Average contact angle (°) | Water | 8.9 | 8.9 | 8.9 | 8.9 | 8.9 |
| | | CH$_2$I$_2$ | 51.7 | 51.7 | 51.7 | 51.7 | 51.7 |
| | Surface free energy (mN/m) | | 33.3 | 33.3 | 33.3 | 33.3 | 33.3 |
| | Surface roughness Sa (μm) 1 day after affixing masking film | | 0.0118 | 0.0116 | 0.0245 | 0.0407 | 0.0476 |
| Base layer | Material | | PMMA/PC laminate | | | PMMA/PC laminate | |
| | Average contact angle (°) | Water | | 79.3 | | | 79.3 |
| | | CH$_2$I$_2$ | | 31.8 | | | 31.8 |
| | Surface free energy (mN/m) | | | 46.5 | | | 46.5 |
| Surface gloss of coating layer after peeling off masking film | Affixed for 1 day | | Good | Good | Good | Poor | Poor |
| | Affixed for 1 week | | Good | Good | Slightly poor | Poor | Poor |

DESCRIPTION OF REFERENCE NUMERALS

10 Laminate for molding
12 Masking film
16 Hard-coat layer
20 Polymethyl methacrylate layer (PMMA resin layer)
22 Polycarbonate layer (PC resin layer)

The invention claimed is:

1. A laminate for molding comprising a hard-coat layer and a masking film affixed to a surface of the hard-coat layer, wherein:
   an adhesive surface of the masking film on the hard-coat layer side has surface free energy of 30.0 (mN/m) or more prior to being affixed, as calculated from the average contact angle of water and the average contact angle of diiodomethane according to the OWRK method;
   the hard-coat layer is curable;
   the surface roughness Sa of the adhesive surface of the masking film is 0.1 μm or less; and
   an adhesive layer of the masking film on the hard-coat layer side comprises polyurethane.

2. The laminate for molding according to claim 1, wherein the masking film comprises polyethylene.

3. The laminate for molding according to claim 1, wherein the hard-coat layer comprises inorganic oxide nanoparticles.

4. The laminate for molding according to claim 3, wherein the inorganic oxide nanoparticles comprise silica having a copolymerizable group on its surface.

5. The laminate for molding according to claim 4, wherein the average particle size of the silica is 5-500 nm.

6. The laminate for molding according to claim 1, wherein the hard-coat layer comprises a (meth)acryloyl polymer.

7. The laminate for molding according to claim 6, wherein the surface roughness Sa of the surface of the hard-coat layer after peeling off the masking film is 0.0300 μm or less.

8. The laminate for molding according to claim 1, wherein the hard-coat layer comprises a leveling agent.

9. The laminate for molding according to claim 8, wherein the leveling agent further comprises a fluorine-based additive or a silicone-based additive.

10. The laminate for molding according to claim 1, wherein the hard-coat layer is energy beam-curable.

11. The laminate for molding according to claim 1, wherein the hard-coat layer further comprises a photopolymerization initiator.

12. The laminate for molding according to claim 1, further comprising a base layer which is layered on the surface of the hard-coat layer on the opposite side from the surface of the hard-coat layer that is affixed to the adhesive surface of the masking film.

13. A curable hard-coat layer comprising a (meth)acryloyl polymer and inorganic oxide nanoparticles, wherein a surface of the hard-coat layer is designed to be affixed to a masking film to form a laminate of claim 1 for molding.

* * * * *